United States Patent

Kalis

[15] 3,648,138
[45] Mar. 7, 1972

[54] ARRANGEMENT FOR FREQUENCY-ANALOGOUS SPEED CONTROL OF AN INDUCTION MACHINE FED THROUGH AN INVERTER

[72] Inventor: Horst Kalis, Hamburg, Germany
[73] Assignee: U.S. Philips Corporation, New York, N.Y.
[22] Filed: Jan. 5, 1970
[21] Appl. No.: 1,075

[30] Foreign Application Priority Data

Jan. 4, 1969 Germany ..................... P 19 00 347.5

[52] U.S. Cl. .......................................................... 318/231
[51] Int. Cl. ............................................................ H02p 7/42
[58] Field of Search ................................. 318/227, 230, 231

[56] References Cited

UNITED STATES PATENTS

| | | | |
|---|---|---|---|
| 3,293,520 | 12/1966 | Lehry | 318/231 X |
| 3,372,323 | 3/1968 | Guyeska | 318/231 X |
| 3,471,764 | 10/1969 | Salihi et al. | 318/231 |
| 3,512,067 | 5/1970 | Landau | 318/231 X |

Primary Examiner—Gene Z. Rubinson
Attorney—Frank R. Trifari

[57] ABSTRACT

A speed control system for an induction motor includes an inverter coupled to the motor stator winding and a second induction machine with its rotor coupled to the motor shaft. The stator of the second machine is energized with a constant-frequency voltage. The frequency of the rotor voltage of the second machine is determined by the stator voltage frequency and the shaft speed. The signal from a reference frequency generator and the rotor frequency are applied to a phase comparator and a synchronizing device, the output signal thereof being applied to a limiter. The rotor frequency is also applied to a frequency detector, the output signal of which is applied to a filter, a differential stage, a device for regulating the inverter voltage or current and a frequency generator that controls the inverter frequency. The filter passes the AC component to the limiter. The output of the differential stage also is applied to the limiter. The limiter output is applied to the frequency generator and to the regulating device to control the motor speed and to maintain the motor flux constant.

9 Claims, 1 Drawing Figure

Patented March 7, 1972
3,648,138
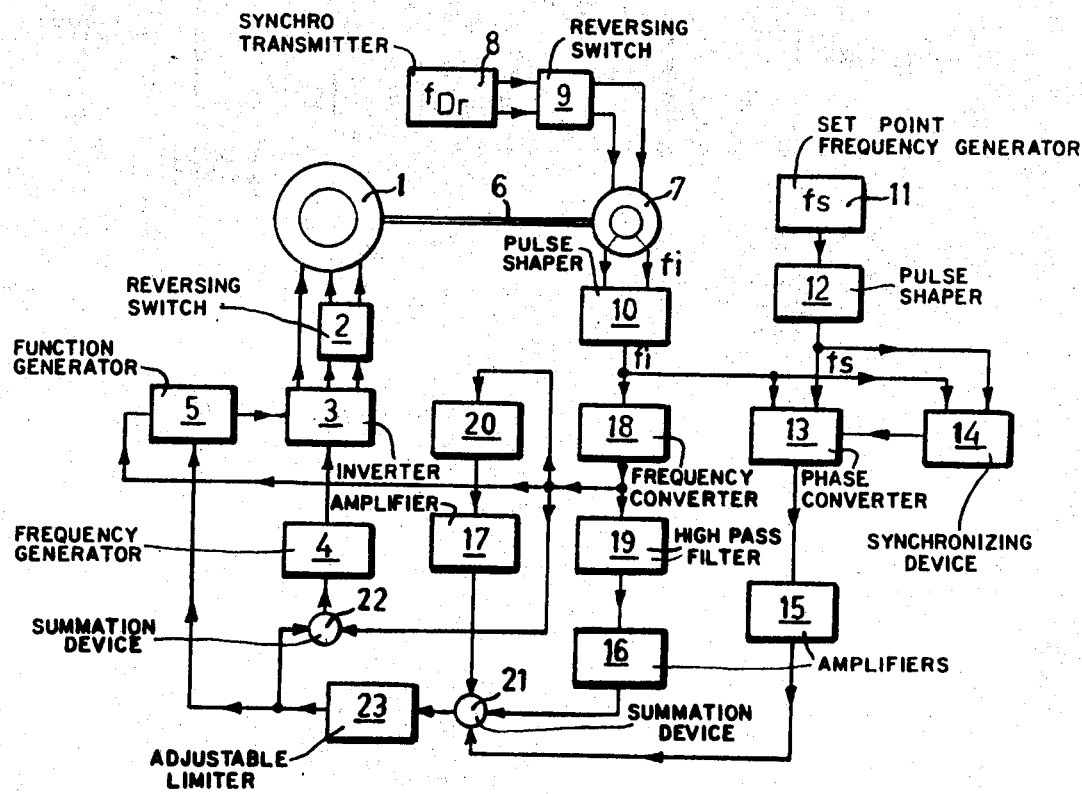
INVENTOR.
HORST KALIS
BY
*Frank R. Trifari*
AGENT

ARRANGEMENT FOR FREQUENCY-ANALOGOUS SPEED CONTROL OF AN INDUCTION MACHINE FED THROUGH AN INVERTER

The present invention relates to an arrangement for frequency-analogous speed control of an induction machine fed through an inverter.

It is known to control the speed of induction machines fed through inverters by means of circuit arrangements. A known embodiment, cf. "Elektrotechnik und Maschinenbau," 83, No. 6, 1966, pp. 370–374, uses a mechanical differential gear one driving shaft of which is connected to the shaft of the machine to be controlled, while the other driving shaft is driven by a small clock synchronous motor the speed of which is adjustable because it is fed by a variable-frequency electronic oscillator. The driven shaft of the differential gear, which has a speed equal to the difference of the speeds of the two driving shafts, is connected to a potentiometer the centertap voltage of which is proportional to the angle of rotation. By means of a voltage-controlled oscillator, the aforesaid voltage causes the frequency of the inverter to be proportional to the angle of rotation. When the induction machine is loaded, the shaft of this motor slightly lags in phase relative to the shaft of the clock synchronous motor which provides the desired or demand value. As a result the increased center-tap voltage of the potentiometer produces a higher inverter frequency which, by way of the resulting increased slip, provides the required torque increase. In the steady-state condition the actually measured or actual value remains exactly equal to the desired value.

However, this embodiment has serious disadvantages. Owing to the use of the clock synchronous motor the speed control range can only be varied in a ratio of 1:4. Hence, at startup the induction machine cannot automatically be brought to the desired speed by means of frequency control. Therefore, its speed must be brought to the desired value by manual switching operations before the control mechanism can become operative.

The desired-value synchronous motor may oscillate and then modulates the desired value so that this value fluctuates.

It is not possible to limit the slip so that in the case of comparatively large and abrupt variations of the desired value or of the load, this may render satisfactory functioning impossible.

In addition the feedback is purely integral. The control is stable solely because of the shunt characteristic of the induction machine within the range $s<s_k$ ($s=$ slip, $s_k=$ pullout slip). The transient phenomena in the case of abrupt variations of the load and the present value frankly are bad.

The voltage is controlled in accordance with the inverter frequency which means that at low inverter frequencies the main flux of the machine and hence the maximum output torque will be greatly decreased.

Another known embodiment uses a direct current tachometer for measuring the actual speed. The required value is given as a direct voltage; cf. doctoral thesis of the Technological University of Darmstadt, 1965, H. Zuerneck: "Ein drhzahlgeregelter, spannungsgesteuerter Stromrichter-Asynchronmotor." (A speed-regulated voltage-controlled converter asynchronous motor.)

The difference between the desired-value voltage and the actual-value voltage is supplied to a speed regulator the output quantity of which can be adjustably limited. The output quantity of the speed regulator serves as the desired value or set point for a secondary speed-regulating circuit which comprises a small direct current motor and a second tachometer which supplies the information about the actual value for this subordinate control circuit. The small direct current machine drives the rotor of a synchro the winding of which is energized by a constant current. The stator of the synchro is mechanically connected to the induction machine fed by the inverter. As a result, the frequency of the stator winding voltage of the synchro is equal to the sum of the mechanical frequency of the synchro rotor driven by the auxiliary control circuit and of the mechanical frequency of the synchro stator and is derived by means of sliprings and is used as a control frequency for the inverter. Hence, in the steady state the output quantity of the speed regulator in the main control circuit is proportional to the rotor frequency of the induction machine.

A constant main flux of the induction machine is approximately attained by supplying the information about the rotor frequency and that about the mechanical angular velocity together with a constant term, which is determined by the respective machine, to a function generator which controls the inverter voltage.

The principle disadvantage of this design is the subordinate small auxiliary control circuit for determining the rotor frequency because the mechanical time constant of this circuit retards the torque setting of the induction machine. Consequently, the stability reserve is reduced and the duration of the regulation process is increased almost by a factor of 10 with respect to a system which does not include this time constant. Furthermore, it is a disadvantage that two small auxiliary machines have to be coupled to the motor shaft (tachometer of the main control circuit and synchro).

The use of a direct voltage tachometer also is a disadvantage since even in the best and most expensive designs interference voltages are superimposed which make up about 0.1 percent of the direct voltage value of the output voltage. As a result, the resolving power is adversely affected and consequently extremely accurate control systems require an additional filtering operation at the expense of the measuring velocity and the stability reserve.

Other known embodiments also employ a direct voltage tachometer for measuring the actual value, with the aforementioned disadvantages. However, the entire signal processing is electronic.

One of these embodiments (periodical "ETZ-A," 89, 5/1968, pages 108-112) for example, compares the tachometer voltage with the direct-voltage which constitutes the desired value or set point and applies the difference of these voltages to a speed regulator. The output voltage of the speed regulator is then compared with a voltage which is obtained by subtraction of the tachometer voltage and a voltage which is proportional to the inverter frequency so that the difference frequency is proportional to the electric rotor frequency. The difference of these two voltages is applied to a rotor frequency regulator the output voltage of which produces the proportional inverter frequency through a voltage-controlled electronic generator.

The voltage proportional to the rotor frequency is also used to obtain a constant main flux of the induction machine. For this purpose, the voltage is applied to a function generator the output quantity of which is the set point for an ancillary current control circuit in which the desired value and the actual value of the current are compared. The resulting deviation or error is applied to a current regulator the output quantity of which acts as a voltage set point in a further ancillary voltage-regulating circuit in which it is compared with the actual value of the voltage of the inverter. Through a voltage regulator the resulting difference controls the inverter output voltage in a manner such that a constant machine main flux is always maintained.

In each of the four ancillary control circuits the respective control quantity may be limited. This is an advantage of this system. A disadvantage, however, besides the aforementioned measurements of the actual value by means of a direct voltage tachometer, is the large number of elements required.

Recently other methods of measuring the actual speed in control circuits have been described which do not have the disadvantages of the direct current tachometer measurements.

In these methods an apparatus is mounted on the shaft of the machine to be controlled which provides an electrical constant-amplitude sharp-pulse train the frequency of which is related to the angular velocity of the motor shaft.

The pulse generator may comprise a disc provided with slots at regular intervals and an optical system consisting of a lamp and a photocell, a pulse being generated each time a slot passes between the lamp and the photocell.

In control systems using such devices for measuring the actual speed, before the regulating mechanism can be set into operation synchronization must always be effected, i.e., the frequencies of the said actual-speed sharp-pulse train and of a set point sharp-pulse train must be made equal. The regulating mechanism proper becomes operative only in the synchronized condition. The phase difference of the two pulse trains sets the torque of the machine in a manner such that in the case of a load increase an increased motor torque is produced by the increasing phase difference. Thus, by proportional regulation with respect to the phase difference an integral regulation (ideal integrator) with respect to the speed is obtained. Thus, any dynamics of the measurements depend only on the frequency of the measuring device. For example, a servosystem including a direct current motor having a very small moment of inertia has been described which uses this measuring principle (I.E.E. International Convention Record, Part 6, 1966, pages 229–249) and which has a bandwidth of 1 kHz. Such regulating dynamics are unattainable with direct voltage tachometers.

A circuit arrangement (cf. Control Engineering, June 1963, pages 92–93) for speed control with the use of this measuring and comparison principle for inverter-fed induction machines has the following design:

On the shaft of the inverter-fed induction machine there is mounted an optical-scanning slotted disc the output pulses of which are converted into a measured needle-pulse train by a pulse shaper stage and are applied to one half of a bistable trigger circuit. The other half of this bistable trigger circuit is controlled by the set point needle-pulse train so that it is continuously caused to change states in synchronism. The mean voltage at an output of the trigger circuit, which is proportional to the phase difference between the set point and actual-speed pulse trains, is filtered out by means of a low-pass filter and is applied to a unijunction frequency generator the frequency of which then is substantially proportional to the phase difference.

The unijunction frequency generator controls the frequency of the inverter.

When the controlled machine is loaded, the actual-speed pulse train slightly lags in phase with respect to the set point pulse train so that, through the increasing output voltage of the bistable trigger stage, the inverter frequency is increased and through the resulting increased slip a larger torque is delivered which counterbalances the increased moment of the load.

This arrangement has quite a number of serious disadvantages. For example, the set point is not continuously adjustable but can only assume a given number of discrete values. Also, the arrangement includes no facility for automatic synchronization. The use of a slotted disc results in an actual-value frequency which is proportional to the speed. Hence, with decreasing speeds the information density of the measurement continuously decreases so that the speed control range is narrowed down. Further, the use of a low-pass filter for obtaining a phase-angle-proportional control voltage for the inverter regulating generator (unijunction generator) is a disadvantage since unavoidable time constants are introduced into the control circuit so that the stability reserve is reduced and the velocity of the regulation process is decreased. Furthermore, even in the linear portion of the motor characteristic curve ($s<s_k$) there is no linear relationship between the slip and the phase angle and between the set point frequency and the actual-value frequency, so that a variation of the set point involves a variation of the control parameters (no simple possibility of optimization). In addition, the control parameters cannot be adjusted so as to be adapted to different range conditions. Also, feedback is purely integral. Hence, regulation is only stable in the range $s<s_k$ owing to the shunt characteristic of the induction machine. Consequently, the transient phenomena are very bad. Finally, there is no possibility of limiting the slip so that in the case of large load or set point surges due to the pullout slip being exceeded, synchronism is lost and inadmissibly high motor currents may occur. Generator operation of the induction machine is impossible.

According to the invention all of the said disadvantages of known arrangements are avoided in that there is coupled to the motor shaft of the induction machine the rotor of a second auxiliary induction machine which is supplied with a stator rotating field of constant frequency and the electric rotor frequency of which is a measure of the speed of the shaft. This frequency, together with a variable set point frequency from a generator, are applied through pulse shaper stages to a fast phase-difference voltage converter and to a synchronizing device the common output quantity of which is applied through an amplifier, together with the alternating portion of the output quantity of a fast set point frequency-voltage converter through an amplifier and with the output quantity of a subtraction device through an amplifier, to a limiter the output quantity of which together with the output quantity of the fast frequency-voltage converter controls a regulating generator which determines the inverter frequency, and in that the inverter voltage or current is controlled or regulated in order to provide a constant machine main flux.

The invention will now be described more fully with reference to a block-schematic diagram shown in the single FIGURE of the accompanying drawing.

An induction machine 1 is connected to an inverter 3 through a reversing contactor 2. The inverter may be a known self-controlled bridge or subharmonic inverter the frequency of which is regulated by a control-frequency generator 4 and the voltage or current of which is regulated by a voltage or current presetting device 5. This voltage or current presetting device in known manner is either a function generator having input quantities which are proportional to the rotor frequency and the speed, or a function generator having an input quantity which is proportional to the rotor frequency in conjunction with current regulation. The presetting device in known manner is required to ensure a constant machine main flux under all operating conditions. The induction machine is connected by a shaft 6 to the rotor of a small induction machine 7 (resolver, synchro) which at the rotor side is provided with sliprings or with a rotary transformer. The stator of machine 7 is energized by a synchro transmitter 8 having a constant frequency $f_{Dr}$ (for example, an electronic sine-cosine generator) through a reversing switch 9 and is used in known manner to form an actual-value sum frequency $f_{lst}=f_{Dr}+n$ (where $n=$ the speed of the shaft 6 expressed in revolutions/second). Thus, the information density of the measurement does not approach a zero value for very small speeds but rather a value determined by the frequency $f_{Dr}$ which can be chosen at will.

The sinusoidal voltage at the frequency $f_{lst}=f_{Dr}+n$ which can be taken from the sliprings of the induction machine 7 is applied to a pulse shaper stage 10 which, at the zero crossover points, delivers very short pulses of constant width and amplitude.

An electronic adjustable frequency generator 11 having a frequency setting range $f_{Dr}$ $f_{Soll}$ $f_{Dr}+n_{max}$ ($n_{max}$ = maximum speed of the shaft 6 expressed in revolutions/second) provides the set point frequency $f_{Soll}$ which is converted in a pulse-shaper stage 12 into a train of pulses identical in shape to that of the output pulses of the pulse shaper stage 10.

A block 13 indicates a fast phase-difference voltage converter which in the case of "synchronism" delivers an output voltage lying within the limits $-2\pi<\Delta\alpha<+2\pi$ ($\Delta\alpha=$ phase difference between set point frequency and actual frequency), which voltage is proportional to $\Delta\alpha$.

In order to avoid time delays the phase-difference voltage converter 13 is provided with a measuring device which for each actual-value frequency pulse determines the phase relationship with the associated set point frequency pulse and converts the set point frequency pulse into a proportional voltage which immediately on termination of the measurement is stored in an analog store (holding circuit) until the arrival of the next measuring value and is available at the output.

In a preferred embodiment of the invention, within a range $0<\Delta\alpha<+2\pi$, each set point frequency pulse initiates a sawtooth voltage having a positive slope proportional to the set point frequency. This voltage is triggered by the actual-value frequency pulse. The value of the sawtooth voltage which appears at the instants of arrival of the actual-value frequency pulse is stored very rapidly (a few $\mu$'s) in a holding circuit whereupon the sawtooth is returned to zero.

Within the range $-2\pi<\Delta\alpha<0$ the start of sawtooth voltage with a negative slope proportional to the set point frequency should correspondingly be triggered by the actual-value frequency pulse, the measuring and returning operations being triggered by the set point frequency pulse.

The output voltage of the phase-difference voltage converter 13 is positive when the set point frequency pulses lead in phase and it is negative when the actual-value frequency pulses lead in phase. A block 14 represents a synchronizing device which always automatically brings about synchronization of the regulation (for example, at starting) so that when $f_{Soll}>f_{Ist}$ the phase-difference voltage converter 13 is influenced so that it delivers a maximum positive direct voltage and when $f_{Soll}<f_{Ist}$ it delivers a maximum negative direct voltage.

Blocks 15, 16, and 17 symbolically indicate amplifiers the amplification factors of which are adjustable and the output voltages of which can be adjustably limited.

A block 18 symbolically indicates a fast frequency-voltage converter which in known manner is designed so that an electronically generated voltage the time dependence of which is:

$$u(t)=A/(T_{min}+t)$$

is started by each actual-value frequency pulse with a time delay $T_{min}$.

The instantaneous value of this voltage, which is determined by $u=A/(T_{min}+t)$ at the instant at which the next actual-value frequency pulse is received, is rapidly stored in an analog store (holding circuit) and is available at the output until the reception of the next measuring value which is obtained in like manner.

The process is repeated at each actual-value frequency pulse since, with a time delay $T_{min}$ after each actual-value frequency pulse, the voltage waveform $u=A/(T_{min}+t$ is started again in the above-described manner. Hence, the analog store always contains a voltage which is proportional to the actual-value frequency during the interval between the two last pulses.

This known principle is used in a manner such that, for example, by direct-voltage superposition for the case $f_{Ist}<f_{Dr}$ the output voltage of the frequency-voltage converter 18 is zero volt and for $f_{Ist}=f_{Dr}+n$ it is proportional to the speed. A block 19 symbolically indicates a device which separates the alternating voltage portion of the frequency-voltage converter output voltage from the direct voltage portion and at its output delivers only the alternating voltage portion. This device may be a high pass filter.

A block 20 symbolically indicates a difference former which measures the sudden voltage changes on reception of an actual-value frequency pulse at the output of the frequency-voltage converter 18, stores these variations during a cycle and delivers them at its output in the form of a proportional voltage. Reference numerals 21 and 22 designate summation points.

A block 23 represents an adjustable limiter required to limit the slip in a manner described more fully hereinafter. The setting frequency generator 4 is a known electronic generator the frequency of which is proportional to the input voltage and the transmission factor of which is chosen so that when the voltage of the frequency-voltage converter 18 alone is applied to its input (i.e., when the output voltage of the limiter 23 is zero), owing to the speed proportionality of the output voltage of converter 18, the induction machine is supplied with a rotating field the frequency of which is equal to the mechanical frequency of the shaft 6.

This forcedly ensures that the output voltage of the limiter 23, which is also applied to the input of the setting frequency generator through the summation point 22, is proportional to the slip of the induction machine so that limiting the output quantity of the limiter 23 means limiting the slip.

When the machine 1 is at standstill, the auxiliary machine 7 delivers a sinusoidal voltage at the frequency $f_{Dr}$ at its rotor sliprings. When the set point generator 11 delivers a higher frequency, for example, $f_{Soll}=f_{Dr}+n_1$, the synchronizing device 14 determines this out-of-synchronism condition and by influencing the phase-difference voltage converter 13 in the aforementioned manner forcedly ensures that at the output of the amplifier 15 a positive voltage appears of such value that a fixedly adjusted maximum positive slip (which is adjustable by means of the limiter 23) so accelerates the machine that the difference $f_{Soll}-f_{Ist}$ is continuously decreased. When synchronism is attained, i.e., $f_{Soll}=f_{Ist}$, the phase-difference voltage converter 13 becomes operative and delivers a voltage which is proportional to the phase difference and in the steady state is proportional to the slip required to compensate for the moment of the load, since the portions delivered by the blocks 19 and 16 and by 20 and 17 are pure alternating voltages and hence become operative to improve the dynamics in the transition phase only.

It is assumed that the machine operates as a motor. When the set point frequency generator is suddenly set at still higher frequencies (a higher set point) the process described as the starting mechanism is repeated.

If, however, an abrupt variation of the set point frequency is effected in a manner such that the new set point requires a lower speed, the synchronizing device 14 forcedly causes the phase-difference voltage converter 13 to deliver a maximum negative output voltage which produces a maximum adjustable negative slip in the induction machine and hence retards the machine (by generator braking) until synchronism is restored. If, however, the machine should still be driven by a mechanical moment instead of being loaded, a permanent negative phase-difference and hence a negative slip will be statically produced and the induction machine operates as a generator. This obviously requires that the inverter 3 be capable of delivering power to the supply lines. Thus, the arrangement can operate as a generator and as a motor. Owing to the measuring arrangement with the induction machine 7 the speed can also be exactly set to zero.

When the direction of rotation of the induction machine 1 is to be changed, the reversing contactor 2 is changed over. As a result the direction of rotation of the rotating field and the direction of rotation of the machine are reversed. Further, in order to obtain a sum frequency $f_{Ist}=f_{Dr}+n$ the direction of rotation of the rotating field of the induction machine 7 must also be reversed by means of the reversing switch 9.

The angular compliance of the machine is ensured by the possibility of adjusting the amplification of the amplifier 15.

The possibility of adjusting the amplification factors of the amplifiers 16 and 17 permits of obtaining an optimum transient for each machine and each moment of inertia in the case of abrupt variations of the load or the set point.

What is claimed is:

1. A speed control system for an induction machine energized by means of an inverter comprising, a second auxiliary induction machine, means coupling the rotor of the second machine to the motor shaft of the first induction machine there is coupled to the rotor of a second, auxiliary induction machine, means for supplying a voltage of constant frequency to the stator winding of the second machine so as to develop therein a rotating field of constant frequency, the frequency of the rotor voltage being determined by the frequency of the stator voltage and the rotation speed of the shaft, first and second pulse shaper stages, a fast phase-difference voltage converter stage, a synchronizing device, a first amplifier, a variable-frequency generator, means for applying the rotor frequency together with a variable set point frequency from said generator through said first and second pulse shaper stages to said fast phase-difference stage and to the synchronizing device the common output quantity of which is applied through said first amplifier to a limiter stage, a fast frequency-voltage converter, a second amplifier, a differential stage coupled to the output of the frequency-voltage converter, a third amplifier, means coupling the frequency-voltage converter to the output of the first pulse shaper stage so that the frequency-voltage converter derives an output voltage with an alternating component, means applying the alternating component of the output voltage of said frequency-voltage converter through the second amplifier and together with the output quantity of said differential stage through said third amplifier to the limiter stage, a frequency-control generator coupled to an input of said inverter, and means for coupling the output quantity of the limiter together with the output voltage of the frequency-voltage converter to said frequency-control generator to control the frequency of the control generator, which determines the inverter frequency, and to regulate the inverter voltage or current in a sense to maintain the machine flux constant.

2. A system as claimed in claim 1, characterized in that the output voltage of the frequency-to-voltage converter is proportional to the speed of the shaft by means of direct voltage superposition.

3. A system as claimed in claim 1, characterized in that the frequency-control generator is designed so that its output frequency is proportional to the sum of the two input quantities and that when the output quantity of the frequency-to-voltage converter alone is present at the input of the frequency-control generator, the induction machine is supplied with a rotating field which is in synchronism with the shaft.

4. A system as claimed in claim 3, characterized in that the output quantity of the limiter is adjustably limited.

5. A system as claimed in claim 3, characterized in that the amplification factors of the amplifiers are variable.

6. A system as claimed in claim 1 wherein the phase-difference voltage converter is arranged to produce a positive output quantity in the case of synchronism and of a lagging phase of the rotor frequency and a negative output quantity in the case of synchronism and of a leading phase of the rotor frequency thereby to permit operation of the machine either as a motor or as a generator.

7. A system as claimed in claim 1 further comprising first and second reversing contactors connected to the inputs of the first and second induction machines, respectively, thereby providing a means for reversal of the direction of rotation.

8. A system as claimed in claim 1 wherein said frequency-control generator comprises a voltage-to-frequency converter that provides an electric output quantity with a frequency determined by the input voltage thereto, the output quantity of the limiter and the output voltage of the frequency-voltage converter being applied to the input thereof.

9. A system as claimed in claim 8 wherein said frequency-control generator further comprises means jointly controlled by the limiter output quantity and the frequency-voltage converter output voltage to regulate the inverter voltage or current as a function of the joint input quantities to maintain constant the machine flux under different operation conditions.

* * * * *